(No Model.)　　　　　　　H. G. BUTLER.　　6 Sheets—Sheet 1.
DISTRIBUTING APPARATUS.

No. 546,692.　　　　　　　Patented Sept. 24, 1895.

Witnesses:　　　　　　　　　　　　　　Inventor:
　　　　　　　　　　　　　　　　　　　Henry G. Butler
　　　　　　　　　　　　　　　By Dyrenforth & Dyrenforth,
　　　　　　　　　　　　　　　　　　　Attys.

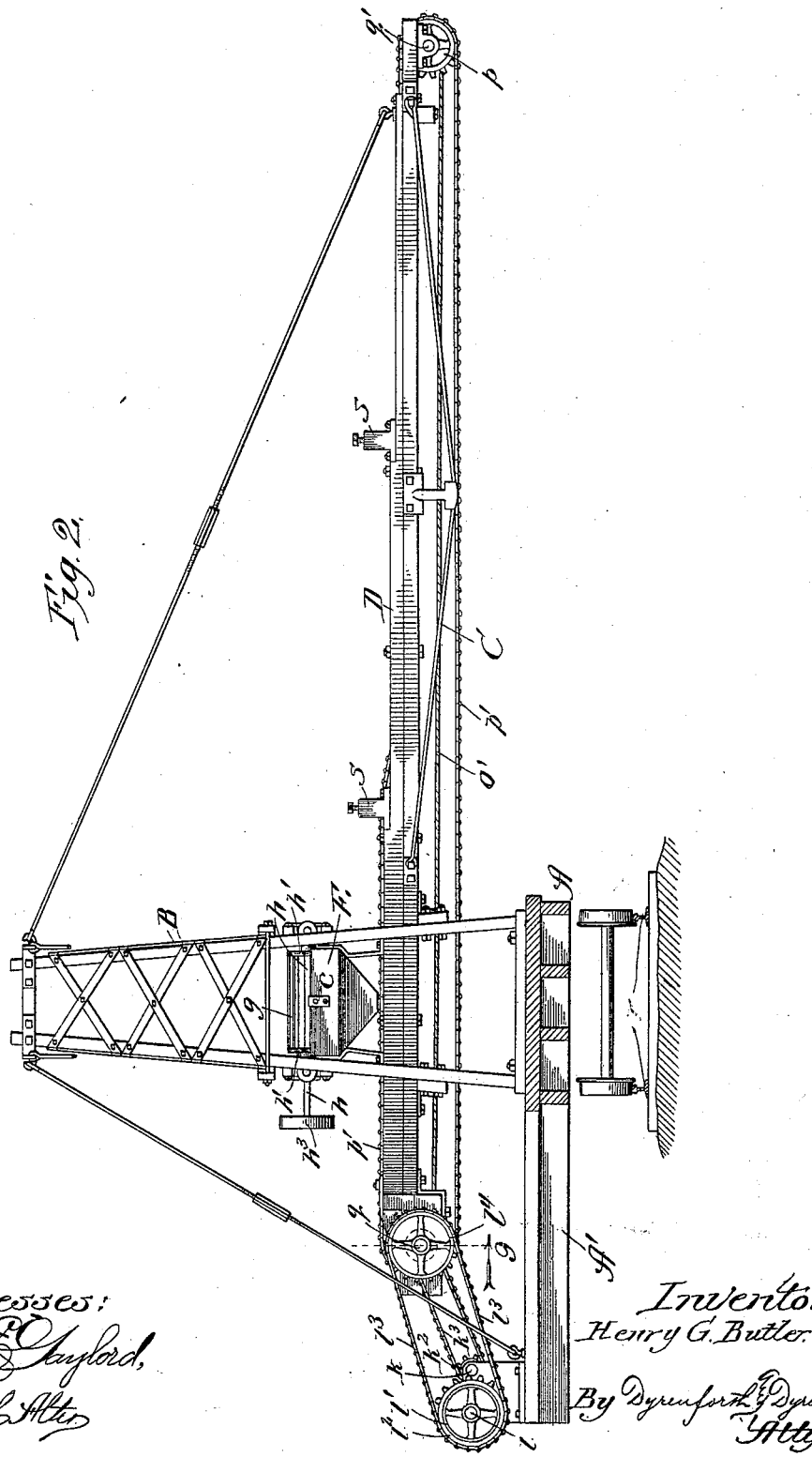

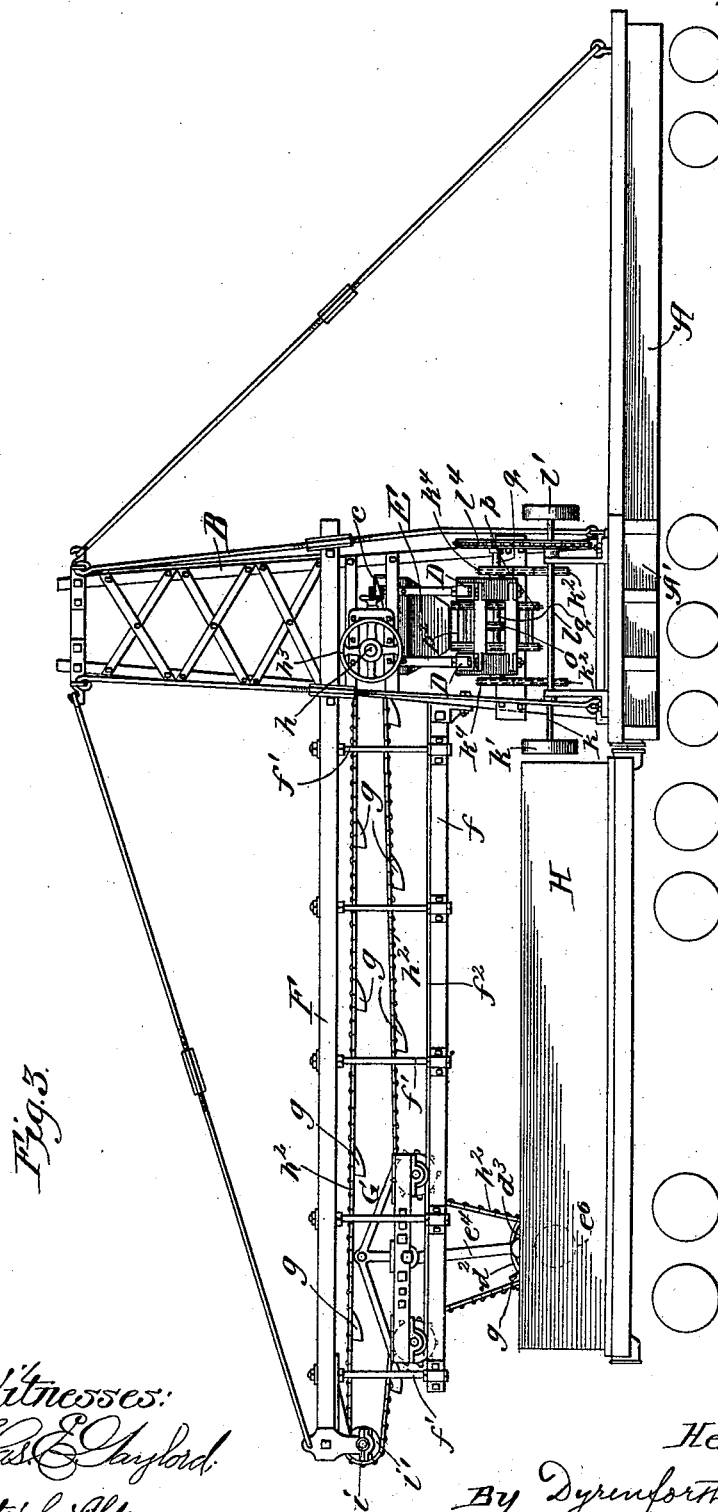

(No Model.) 6 Sheets—Sheet 4.
H. G. BUTLER.
DISTRIBUTING APPARATUS.
No. 546,692. Patented Sept. 24, 1895.
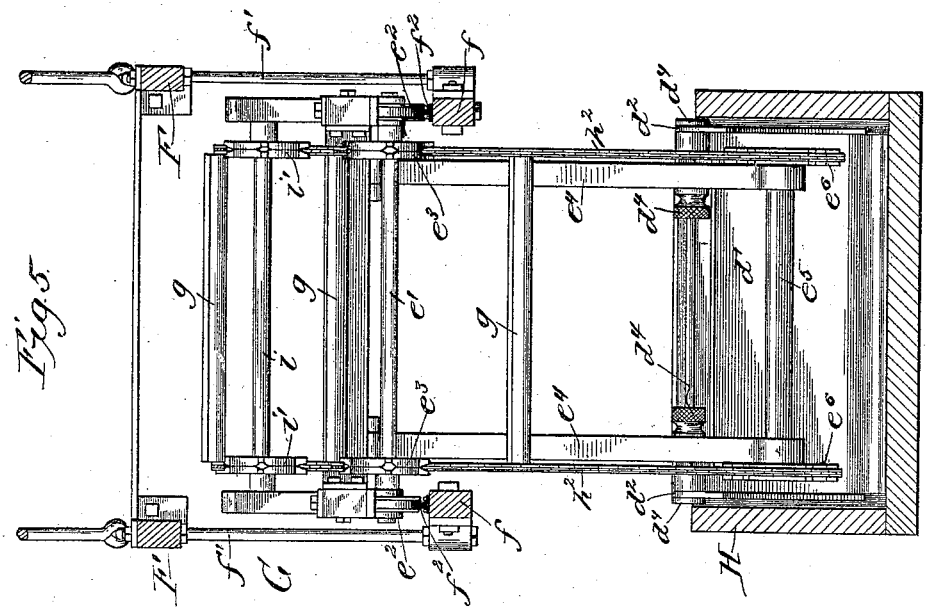
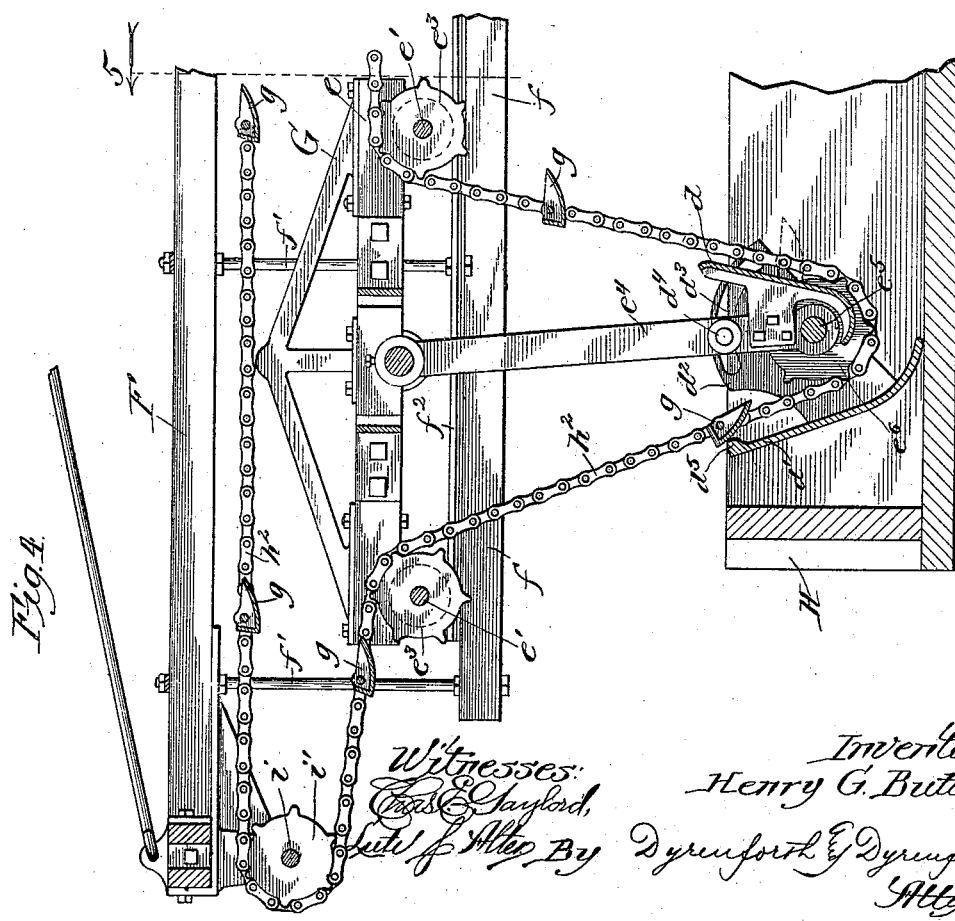
Witnesses:
Chas. E. Gaylord,
Inventor:
Henry G. Butler
By Dyrenforth & Dyrenforth,
Attys.

(No Model.) 6 Sheets—Sheet 5.
H. G. BUTLER.
DISTRIBUTING APPARATUS.

No. 546,692. Patented Sept. 24, 1895.

Witnesses:
Inventor:
Henry G. Butler.
By Dyrenforth & Dyrenforth,
Attys.

(No Model.) 6 Sheets
H. G. BUTLER.
DISTRIBUTING APPARATUS.
No. 546,692. Patented Sept. 24, 1895.
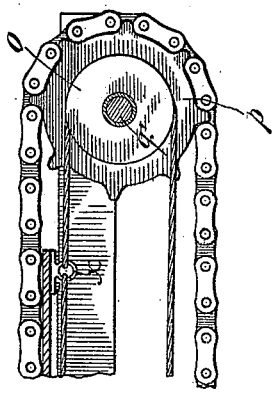
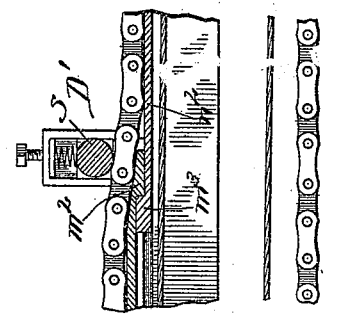
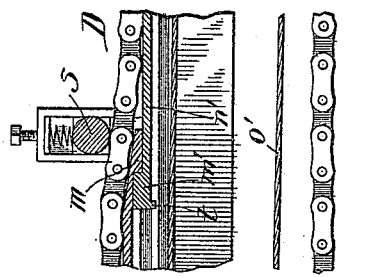
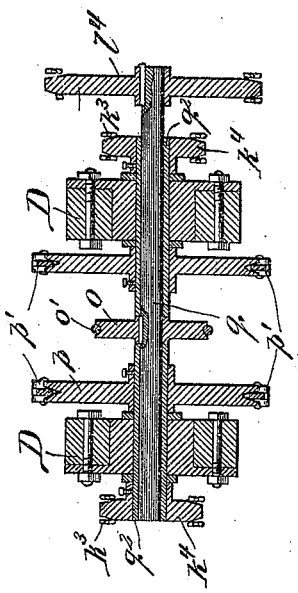
Fig. 8.
Fig. 9.
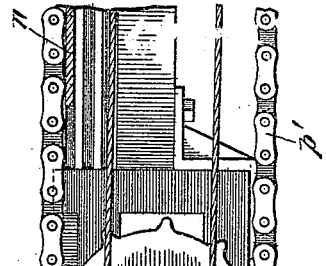
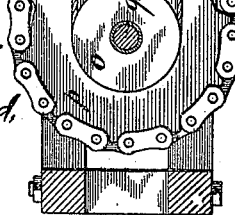
Witnesses:
Inventor:
Henry G. Butler.
By Dyrenforth & Dyrenforth,
Attys.

UNITED STATES PATENT OFFICE.

HENRY G. BUTLER, OF KENOSHA, WISCONSIN.

DISTRIBUTING APPARATUS.

SPECIFICATION forming part of Letters Patent No. 546,692, dated September 24, 1895.

Application filed August 11, 1894. Serial No. 520,064. (No model.)

*To all whom it may concern:*

Be it known that I, HENRY G. BUTLER, a citizen of the United States, residing at Kenosha, in the county of Kenosha and State of Wisconsin, have invented a new and useful Improvement in Distributing Apparatus, of which the following is a specification.

In burning clay to make ballast, according to the method now commonly in vogue, a so-called "fire" is built in the open air and is composed of the material being burned to make the ballast, by piling it on a suitably-kindled long bed, extending, say, a thousand or more feet in length along the ground, and upon which layers of the clay to be converted into the igneous product known as "ballast" and dug from along the line of the fire are applied from time to time alternately with coal, which is strewn thereon as fuel. Since the beginning of this mode of ballast-burning the proceeding has been materially simplified and cheapened by the use of machinery in about every particular, excepting that of strewing the coal upon the fire, which is still done mainly by manual labor, and accordingly requires the employment of many hands, with consequent expense and liability to imperfection in the product.

The primary object of my improvement is to provide a machine which shall serve effectively to perform this coal-distributing operation and thus take the place of many men, to the advantage of the product, not only in the matter of expense in manufacturing it, but also in its quality, by reason of the comparative evenness with which it performs its strewing function, and in other particulars.

My improved apparatus is illustrated in the accompanying drawings, in which—

Figure 1:
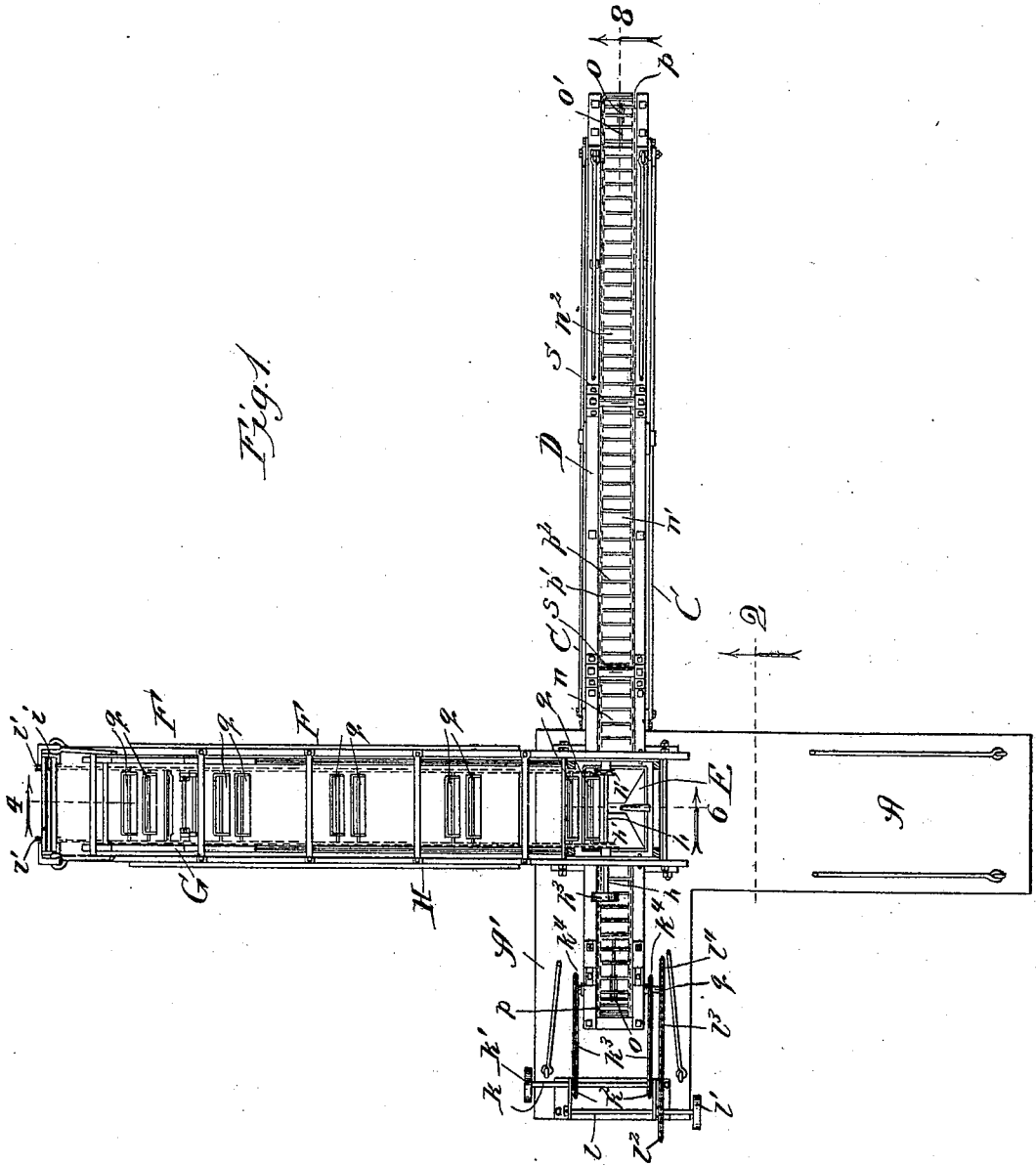
Figure 6:
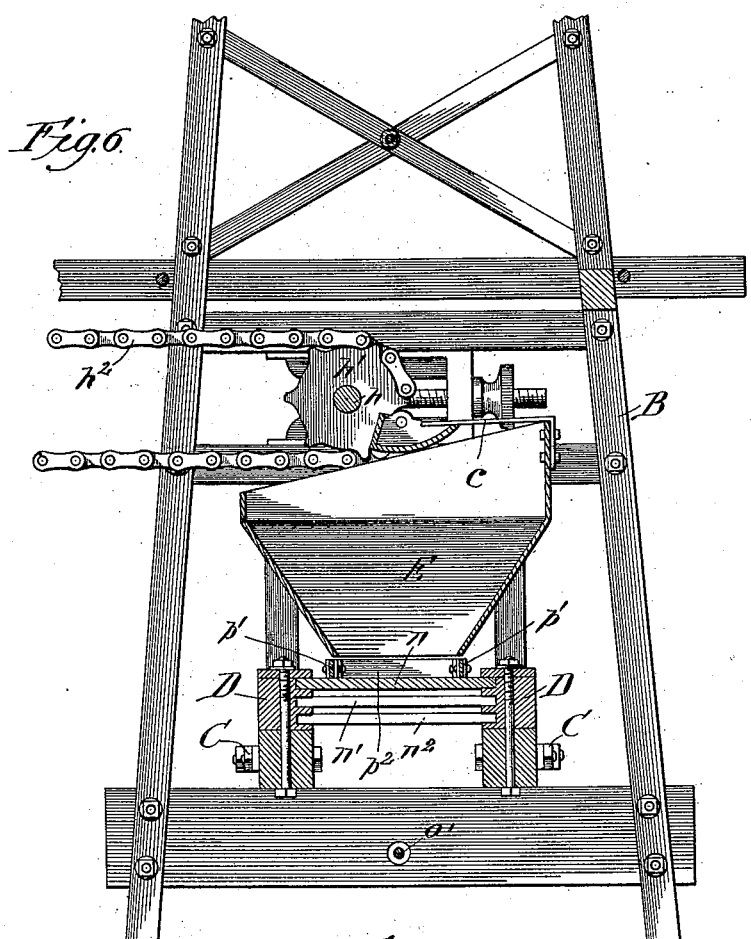
Figure 7:
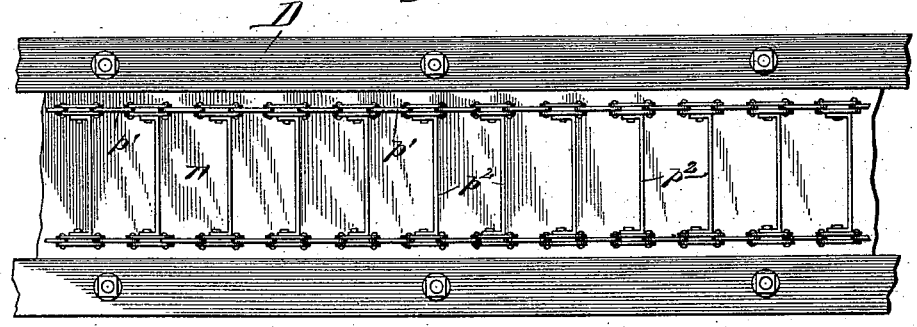

Figure 1 is a sectional plan view of the machine in its entirety; Fig. 2, a section of the same taken at the line 2 on Fig. 1 and viewed in the direction of the arrow; Fig. 3, a view of the machine in side elevation, regarded from a position at right angles to the view presented by Fig. 2, and showing, mainly, the automatic feed to the distributer; Fig. 4, a section taken at the line 4 on Fig. 1, viewed in the direction of the arrow and enlarged, showing details of the construction of the scooping mechanism of the feeder; Fig. 5, a section taken at the line 5 on Fig. 4 and viewed in the direction of the arrow; Fig. 6, a section taken at the line 6 on Fig. 1, viewed in the direction of the arrow and enlarged, showing the delivery end of the feeder where it discharges upon the distributer; Fig. 7, a broken plan view of the conveyer mechanism of the distributer; Fig. 8, a broken section taken at the line 8 on Fig. 1, viewed in the direction of the arrow and enlarged, showing details of the conveyer mechanism of the distributer; and Fig. 9 is a section taken at the line 9 on Fig. 2, viewed in the direction of the arrow and enlarged.

A is the base of the distributing apparatus, which may, and preferably is, particularly for the ballast-burning purpose referred to, an ordinary flat railway-car having a lateral extension $A'$ projecting horizontally from one side, the car being adapted to be moved on a track $r$, which may be presumed to extend lengthwise along one side of the aforesaid "fire." (Not shown.) On the support A is a mast B, suitably braced, as shown, and from the mast there extends horizontally outward and backward for some distance along the extension $A'$, in the direction at right angles to the car and to any desired distance beyond the same, a frame C for the conveyer mechanism of the distributer, the detailed construction of which is as follows: Near opposite ends of the frame C are journaled shafts $q$ and $q'$, each carrying two sprocket-wheels $p$, those on the shaft $q$ being on loose sleeves $q^2$ thereon, while those on the shaft $q'$ should be fast upon it; and between each pair of the sprocket-wheels is a pulley $o$, the pulleys carrying an endless belt $o'$ and being smaller in diameter than the sprocket-wheels, and that on the shaft $q$ being fast thereon while that on the shaft $q'$ is loose. The sprocket-wheels carry endless chains $p'$ or belts, extending between which at intervals and transversely of the frame C are scraper-bars $p^2$. These parts afford a species of endless conveyer D, and the chains $p'$ travel at a greater speed than the belt $o'$ because of the greater diameter of the sprocket-wheels $p$ than that of the pulleys $o$. In the sides of the frame C is supported, to be reciprocated lengthwise therein, an extension-table or base $D'$ for the conveyer D, shown as formed in three longitudinal telescoping sections $n$, $n'$, and $n^2$, the first-named being by preference stationary and overlapping at a head $m$ on its forward end the head $m'$ on the adjacent end of the section $n'$, which has a head $m^2$ at its outer end overlapping a similar head $m^3$ on the adjacent inner end of the section $n^2$. These sections of the extension-base D' are thus in the nature of telescoping sections, inasmuch as when the outermost is moved outward to its full length the engagement of its head $m^3$ with the head $m^2$ on the section $n'$ pulls the latter out to its full length, when its inner head engages and is stopped by the head $m$ on the section $n$. This extension of the table-sections is caused by actuating the traveling belt $o'$, which is fastened at $x$ to the outer end of the section $n^2$, and when the direction of motion of the belt $o'$ is reversed, it obviously withdraws the section $n^2$ till it abuts against a stop $t$ below the head $m'$, when it carries back with it the section $n'$. Thus the telescoping table D' may be caused to extend to the outer end of the frame C.

To actuate the conveyer D and the table D', I show a drive-shaft $l$, carrying a belt-pulley $l'$, at which to connect it with any suitable driving-power or engine, (not shown,) but which is supported on the car A, the shaft $l$ also carrying a sprocket-wheel $l^2$, connected by an endless chain $l^3$ with a sprocket-wheel $l^4$ on the shaft $q$. Another driving-shaft $k$ is also shown, carrying a belt-pulley $k'$ at which to connect it with the aforesaid driving-power, the pulley $k'$ being driven at the same speed and being the same size as the pulley $l'$ and the shaft-carrying sprocket-wheels $k^2$, connected by endless chains $k^3$ with the sprocket-wheels $k^4$ on the sleeves $q^2$. Thus, as will be seen, the belt $o'$ and the conveyer-chains $p'$ may be actuated independently of each other, the latter traveling faster than the former, owing to the pulleys $o$ being of less diameter than the sprocket-wheels $p'$ and to the wheels $k^2$ and $l^2$ being driven at the same speed as the pulleys $k'$ and $l'$, with the wheels $l^2$ of greater diameter than the wheels $k^2$, and by disconnecting either from the driving-power at its driving-shaft it may be brought to a standstill while movement of the other is continued, while by reversing the action of the driving-engine referred to the direction of motion of the belt $o'$ may be reversed at will, as also that of the chains $p'$, though there is no need of reversing them, for, by taking off the driving-belt of the pulley $l$, they may be stopped during the folding operation of the base-sections $n$, $n'$, and $n^2$, produced by the reverse motion of the belt $o'$. If, then, with the table D' in its folded or withdrawn condition, say coal be dumped at one point continuously upon it, and the conveyer and table be set in motion in the direction of extending the latter, the conveyer, by traveling at a faster speed than the table-sections, will, by its scraper-bars $p^2$ moving along the latter, carry the coal forward and drop it between the scraper-bars over the outer end of the outermost advancing table-section, thereby strewing it; and if the distributer D be employed to extend over the sloping breast of a ballast-burning fire, as aforesaid, the latter will thus have the coal strewn upon it throughout an area up or down it about corresponding with the width of the conveyer D, this operation being repeated upon adjacent widths by moving the car A along the track $r$, as required. By my improved construction of distributer, the strewing of the coal will also take place in the return or contracting motion of the table-sections, as by stopping the motion of the chains $p'$ when the table has been extended to its full or any desired length, when the motion of the table-sections, which obviously will be covered with coal, will cause it to open the bottoms of the spaces between the scraper-bars in succession and permit the unsupported coal to drop through.

The spring-controlled rollers $s$ (shown most clearly in Fig. 8) serve by bearing against the chains $p'$ to hold the scraper-bars $p^2$ down with adequate firmness against the bed D'.

For feeding the coal to the hopper E, which is supported on the mast B to discharge upon the conveyer, I provide the feeder, of which the following is a description: On a frame F, extending horizontally outward with relation to the mast B at a right angle thereto from a point above the hopper, and which frame may be supported on and braced from the mast, as shown, are journaled near its opposite ends shafts $i$ and $h$, the former carrying on its end portions a pair of sprocket-wheels $i'$ and the latter, similarly, a pair of sprocket-wheels $h'$. Over these sprocket-wheels are extended endless chains $h^2$, which may be driven from the aforesaid driving-power by connecting therewith the shaft $h$ at its belt-pulley $h^3$. Between the chains $h^2$ are journaled at suitable intervals apart scoops or buckets $g$, hung to tend normally to assume an upright position. From the opposite sides of the frame F are suspended by the rigidly-pendent rods $f'$ the bars $f$, extending parallel with the sides of the frame above them and carrying tracks $f^2$ for guiding a carriage G, which tracks are thus below the upper plane of the feeder or supplementary conveyer, or that portion thereof comprising so much of the chains $h^2$ and buckets $g$ as is above the sprocket-wheels $h'$ and $i'$. This carriage comprises connected side frames $e$ on axles $e'$, extending between them near their opposite ends and carrying wheels $e^2$, at which the carriage is supported on the track $f^2$, and between the wheels $e^2$ the axles carry loosely sprocket-wheels $e^3$, over which the chains $h^2$ pass. From the longitudinal centers of the frames $e$ are suspended by journaling them hanger-bars $e^4$, connected at their lower ends by a shaft $e^5$, carrying rotary sprocket-wheels $e^6$, about which the chains $h^2$ also pass. A righting-shield $d$ is fastened to the hanger-bars $e^4$ to extend between them at one (their forward) side in the path of the backs of the buckets $g$, and another bucket-tilting shield $d'$ extends across the hanger-bars to the rear thereof, being supported on them by side plates $d^2$, provided with arc-shaped slots $d^3$ to admit and be engaged by set-screw fastening means $d^4$ on the hanger-bars and afford a medium for adjusting the direction of the latter, as for changing the set of the shield $d'$ to regulate the tilt of the buckets for filling. The carriage G thus directs the bucket-carrying chains $h^2$ across the inner face of the shield $d'$ and across the outer face of the shield $d$ into the mass of material to be scooped up and conveyed off, which may be coal contained in a box-car H coupled to the car carrying the distributer. By setting the shaft $h$ in motion the chains $h^2$ are caused to travel, and the carriage G guides the buckets $g$ in succession with their rear sides against an abutment $d^5$ at the inner upper edge of the shield $d'$, which tilts them to project their forward or beak ends toward the coal to be scooped. This shield guides the buckets in their tilted position till they fill, when their rear sides encounter the outer face of the shield $d$, which rights and sustains them in upright position while ascending and until they have cleared the mass of obstructing coal in the car; and the traveling chains carry the buckets to the hopper E, into which they are dumped in succession by encountering therein in rising a stop $c$, projecting forward from the rear side of the hopper into the path of the buckets.

The car H is emptied of coal from the end at which the carriage G is first applied toward the opposite end, the carriage being moved on its track by the friction of the chains $h^2$ as the coal is removed from obstructing it in the car. It will thus be seen that not only is my improved distributer automatic in its operation, but also that it may be fed automatically. I do not, however, wish to be understood from this fact as implying that the automatic feed and the distributer are necessarily dependent one upon the other, as there are uses where each may be employed to advantage by itself; nor do I wish to be understood as considering my improved machine, or either feature thereof, to be in any sense restricted to the particular use in connection with which I have chosen herein to describe its operation, for it may be applied advantageously to various other purposes. Moreover, the particular details of construction shown and described, while they are the best now known to me for the embodiment of my invention, may be variously modified or departed from by those skilled in the art without thereby departing from the invention.

What I claim as new, and desire to secure by Letters Patent, is—

1. In a distributing apparatus, a conveyer device having a base formed in sections $n$, $n'$, $n^2$ with a stop $t$ on the middle section, said sections overlapping and engaging each other at adjacent ends and supported to slide telescopically one upon the other to fold and extend them lengthwise, and means for actuating said base to fold and extend it, substantially as described.

2. In a distributing apparatus, a conveyer device comprising a frame C extending from a suitable support, endless traveling chains having the interposed scraper-bars at intervals and supported on said frame, a base D' comprising the telescopically slidable sections supported on the frame to be extended and contracted independently of the movement of said chains and provided with an operating cable, and means for actuating the chains and base at differential speed, substantially as described.

3. In a distributing apparatus, a conveyer device comprising a frame C on a car A supported to move on a track $r$, endless traveling chains having the interposed scraper-bars at intervals and supported on said frame, a base D' comprising the telescopically slidable sections supported on the frame to be extended and contracted independently of the movement of said chains and provided with an operating cable, and means for actuating the chains and base at differential speed, substantially as described.

4. In combination with a frame F, endless chains carrying pivotally between them, at intervals, buckets $g$, a track suspended from the frame, a carriage G movably supported on said track and provided with sprocket-wheels $e'$ and pendent bars $e^4$ carrying sprocket-wheels $e^5$, a forward shield $d$ and a rear shield $d'$ having end-plates $d^2$ provided with segmental slots $d^3$ by which the pendent bars are adjustably connected with the end-plates, the conveyer-chains passing about said sprocket-wheels, substantially as described.

5. In combination, a distributing apparatus having a distributer-conveyer device, and an automatic feed comprising a supplementary conveyer-device extending at an angle to the distributer and formed with endless chains carrying pivotal buckets, a carriage movably supported on a track below the upper plane of said endless chains and carrying sprocket-wheels $e^3$ and pendent arms $e^4$ carrying sprocket-wheels $e^6$ and shields $d$ and $d'$, and a dumping-stop $c$ at the distributer in the path of said buckets, substantially as described.

HENRY G. BUTLER.

In presence of—
W. U. WILLIAMS,
J. N. HANSON.